(12) United States Patent
Levita

(10) Patent No.: US 10,018,717 B2
(45) Date of Patent: Jul. 10, 2018

(54) ELECTROMAGNETIC SEARCH AND IDENTIFICATION, IN NEAR FIELD ARENAS

(71) Applicant: LEVITECTION Ltd., Haifa (IL)

(72) Inventor: Gideon Levita, Haifa (IL)

(73) Assignee: LEVITECTION LTD., Haifa (IL)

( * ) Notice: Subject to any disclaimer, the term of this patent is extended or adjusted under 35 U.S.C. 154(b) by 110 days.

(21) Appl. No.: 15/302,173

(22) PCT Filed: Apr. 2, 2015

(86) PCT No.: PCT/IL2015/050361
§ 371 (c)(1),
(2) Date: Oct. 6, 2016

(87) PCT Pub. No.: WO2015/155764
PCT Pub. Date: Oct. 15, 2015

(65) Prior Publication Data
US 2017/0038467 A1    Feb. 9, 2017

Related U.S. Application Data

(60) Provisional application No. 61/975,936, filed on Apr. 7, 2014.

(51) Int. Cl.
*G01S 13/88* (2006.01)
*G01S 13/89* (2006.01)
*G01S 7/35* (2006.01)
*G01S 7/41* (2006.01)
*G01S 13/00* (2006.01)
*G01S 13/84* (2006.01)
*G01S 13/87* (2006.01)

(52) U.S. Cl.
CPC .............. *G01S 13/89* (2013.01); *G01S 7/354* (2013.01); *G01S 7/41* (2013.01); *G01S 7/411* (2013.01); *G01S 13/003* (2013.01); *G01S 13/84* (2013.01); *G01S 13/878* (2013.01); *G01S 13/887* (2013.01)

(58) Field of Classification Search
None
See application file for complete search history.

(56) References Cited

U.S. PATENT DOCUMENTS

2005/0206555 A1* 9/2005 Bridgelall ................ G01S 5/14
342/127
2007/0290916 A1* 12/2007 Ofek ........................ G01S 7/36
342/19

(Continued)

FOREIGN PATENT DOCUMENTS

EP          0477094 A1 *  3/1992  .......... G01S 13/325

*Primary Examiner* — Charlie Y Peng
(74) *Attorney, Agent, or Firm* — Mark M. Friedman

(57) ABSTRACT

Sensing, in particular a generic and innovative search and identification of objects in an arena, of interest based on electromagnetic detection and/or imaging, self-focused, in the near field, with high range resolution, cross-range resolution, nearby arenas functionality, high range resolution, and accuracies, as compared to conventional solutions. Larger volume arenas can be searched with greater range resolution, accuracy, and cross range resolution as compared to conventional solutions. Embodiments include implementations sufficiently low power to be acceptable for use in human applications (for example, meeting HERP standards).

20 Claims, 10 Drawing Sheets

(56) References Cited

U.S. PATENT DOCUMENTS

| | | | | |
|---|---|---|---|---|
| 2008/0169961 A1* | 7/2008 | Steinway | ................. | A61B 5/05 342/27 |
| 2010/0039228 A1* | 2/2010 | Sadr | ......................... | G01S 5/12 340/10.1 |
| 2016/0084946 A1* | 3/2016 | Turbide | ................. | G01S 7/497 356/4.01 |

* cited by examiner

| RC(x,y,z) | | | |
|---|---|---|---|
| $\varphi_{R\,3,1}$ | $\varphi_{R\,32}$ | $\varphi_{R\,i,3}$ | $\varphi_{R\,(I,J)}$ |
| $\varphi_{R\,2,1}$ | $\varphi_{R\,2,2}$ | $\varphi_{R\,i,j}$ | $\varphi_{R\,2,4}$ |
| $\varphi_{R\,(1,1)}$ | $\varphi_{R\,12}$ | $\varphi_{R\,1i}$ | $\varphi_{R\,1,J}$ |

FIGURE 13

ELECTROMAGNETIC SEARCH AND IDENTIFICATION, IN NEAR FIELD ARENAS

FIELD OF THE INVENTION

The present invention generally relates to sensing, and in particular, it concerns electromagnetic search and identification of objects in an arena of interest.

BACKGROUND OF THE INVENTION

Search, imaging and identification and imaging of relatively small objects within relatively large volumes and at short ranges is an important challenge that has not been met yet for many years, despite tremendous efforts that have been carried out in many sensing disciplines. Meeting this challenge has practical applications in many regions of our life such as un-noticeable identifying of concealed metal objects on a person's body or electromagnetic medical imaging of human body.

Conventional thought is to use two major sensing candidate disciplines for the above challenge: electromagnetic and electro-optics (optical sensing). Each discipline has advantages and disadvantages. The optical sensing advantages include high angle and cross range resolutions and nearby capability, however limited in searching of large volume arenas and in range resolution and accuracy. The electromagnetic sensing provides large volume search advantage and range resolution and accuracy, however generally limited in angle and cross range resolutions and in nearby arena search. Some conventional implementations, while theoretically possible, are unacceptable for use in situations involving humans, as the power required for conventional implementation is considered hazardous to human health.

SUMMARY

In general, a generic and innovative method and system for electromagnetic search in large volumes, detection and/or imaging, self-focused, in the near field, with high resolutions, with identified implementation is presented. Innovative methods and systems feature high angle and cross range resolutions, nearby arenas functionality, high range resolution, and accuracies. Larger volume arenas can be searched with greater range resolution, accuracy, and cross range resolutions as compared to conventional solutions. Embodiments include implementations sufficiently low power to be acceptable for use in human applications (for example, meeting HERP [Hazard of Electromagnetic Radiation to Personal] standards).

Embodiments have practical applications in many regions of our life such as un-noticeable identifying of concealed metal objects on a person's body, electromagnetic medical imaging of a human body, or cooperative particles in a human body (both relatively small numbers and multitudes of cooperative particles).

According to the teachings of the present embodiment there is provided a method for sensing including the steps of:
(a) generating, for each of a multitude of resolution cells, a plurality of phase corrections, wherein each of the phase corrections:
 (i) corresponds to one of a plurality of transmitter and receiver pairs, and
 (ii) is based on a residue of a phase difference between:
  (A) a sum of distances from a given transmitter to the resolution cell and from a given receiver to the resolution cell, wherein the given transmitter and the given receiver are from the corresponding transmitter and receiver pair; and
  (B) a round trip distance from an element formation center to the resolution cell, wherein the element formation center is a reference point corresponding to locations of the transmitters and receivers,
(b) transmitting sequentially a signal from each of the transmitters;
(c) receiving a received signal in parallel with the transmitting;
(d) calculating a phase corrected signal from each phase correction based on the received signal for a corresponding transmitter and receiver pair; and
(e) summing the phase corrected signal for each the resolution cell to generate an emphasized object outcome.

In an optional embodiment, each of the resolution cells is at a pre-determined location and has a given volume. In another optional embodiment, after an initial execution of the steps of for sensing with the multitude of resolution cells having the given volume, then subsequently executing the steps for sensing with a subset of the multitude of resolution cells each having a second volume smaller than the given volume and locations based on the initial execution. In another optional embodiment, the initial execution uses a first frequency and the subsequent execution uses a second frequency, the second frequency higher than the first frequency. In another optional embodiment, the initial execution uses a first set of coefficients for the calculating, the first set of coefficients generated off-line, and the subsequent execution uses a second set of coefficients, the second set of coefficients generated after beginning the initial execution.

In another optional embodiment, the phase corrected signal is calculated by subtracting the phase correction from the received signal for a corresponding transmitter and receiver pair. Another optional embodiment includes a step of weighting the received signal prior to the calculating. Another optional embodiment includes a step of calculating a threshold for an object neighborhood of each the resolution cell. Another optional embodiment includes a step of providing object detection based on comparing each the emphasized object outcome to each the threshold.

In another optional embodiment, after an initial execution of the steps for sensing with the signal being a low-frequency signal, then based on the emphasized object outcome subsequently executing the steps for sensing with the signal being a high-frequency signal, the high-frequency signal having a greater frequency than the low-frequency signal.

Another optional embodiment includes the steps of:
(f) generating, for each of the multitude of resolution cells, a plurality of amplitude corrections, wherein each of the amplitude corrections:
 (i) corresponds to one of the plurality of transmitter and receiver pairs, and
 (ii) is based on a ratio between:
  (A) a multiplication of distances from the given transmitter to the resolution cell and from the given receiver to the resolution cell, wherein the given transmitter and the given receiver are from the corresponding transmitter and receiver pair; and
  (B) a square of distance from the element formation center to the resolution cell.
(g) calculating an amplitude corrected signal from each the amplitude correction based on the received signal for a corresponding transmitter and receiver pair; and [see next claims for a specific technique for doing the calculating.]

(e) wherein the summing includes summing the amplitude corrected signal.

In another optional embodiment, the amplitude corrected signal is calculated by dividing an amplitude of the received signal by an amplitude correction for a corresponding transmitter and receiver pair.

In another optional embodiment, a first amount of the receivers are operational for the receiving to provide a first cross range resolution at a first distance and a second amount of the receivers are operational for the receiving to provide the first cross range resolution at a second distance, wherein
 the first and second distances are from the receivers,
 the second distance is less than the first distance; and
 the second amount of receivers is less than the first amount of receivers.

In another optional embodiment, the transmitters and the receivers are configured in a configuration selected from the group consisting of:
 (a) linear;
 (b) curved;
 (c) planar;
 (d) three-dimensional (3D); and
 (e) a combination of configurations.

In another optional embodiment, at least a portion of the locations of the transmitters and receivers are synthetically established.

In another optional embodiment, the transmitting and the receiving include phase shifting performed using only digital signal processing.

According to the teachings of the present embodiment there is provided a system for sensing including:
 (a) a plurality of transmitter and receiver pairs; and
 (b) a processing system containing one or more processors, the processing system being configured to:
  (i) generate, for each of a multitude of resolution cells, a plurality of phase corrections, wherein each of the phase corrections:
   (A) corresponds to one of a plurality of the transmitter and receiver pairs; and
   (B) is based on a residue of a phase difference between:
    (I) a sum of distances from a given transmitter to the resolution cell and from a given receiver to the resolution cell, wherein the given transmitter and the given receiver are from the corresponding transmitter and receiver pair; and
    (II) a round trip distance from an element formation center to the resolution cell, wherein the element formation center is a reference point corresponding to locations of the transmitters and receivers,
  (ii) activate transmitting sequentially a signal from each of the transmitters;
  (iii) activate receiving a received signal in parallel with the transmitting;
  (iv) calculate a phase corrected signal from each phase correction based on the received signal for a corresponding transmitter and receiver pair; and
  (v) sum the phase corrected signal for each the resolution cell to generate an emphasized object outcome.

In an optional embodiment, each of the resolution cells is at a pre-determined location and has a given volume.

In another optional embodiment, the processing system is further configured: after an initial execution of the processing with the multitude of resolution cells having the given volume, then subsequently executing the processing with a subset of the multitude of resolution cells each having a second volume smaller than the given volume and locations based on the initial execution.

In another optional embodiment, the processing system is further configured to activate the transmitters during the initial execution to transmit a first frequency and during the subsequent execution to transmit a second frequency, the second frequency higher than the first frequency.

In another optional embodiment, the processing system is further configured with a first set of coefficients to calculate during the initial execution, the first set of coefficients generated off-line, and configured with a second set of coefficients to calculate during the subsequent execution, the second set of coefficients generated after beginning the initial execution.

In another optional embodiment, the processing system is further configured to calculate the phase corrected signal by subtracting the phase correction from the received signal for a corresponding transmitter and receiver pair.

In another optional embodiment, the processing system is further configured: after an initial execution of the processing with the signal being a low-frequency signal, then based on the emphasized object outcome subsequently executing the processing with the signal being a high-frequency signal, the high-frequency signal having a greater frequency than the low-frequency signal.

In another optional embodiment, the processing system is further configured to:
 (vi) generate, for each of the multitude of resolution cells, a plurality of amplitude corrections, wherein each of the amplitude corrections:
  (A) corresponds to one of the plurality of transmitter and receiver pairs, and
  (B) is based on a ratio between:
   (I) a multiplication of distances from the given transmitter to the resolution cell and from the given receiver to the resolution cell, wherein the given transmitter and the given receiver are from the corresponding transmitter and receiver pair; and
   (II) a square of distance from the element formation center to the resolution cell.
 (vii) calculate an amplitude corrected signal from each the amplitude correction based on the received signal for a corresponding transmitter and receiver pair; and
 (viii) wherein the sum includes summing the amplitude corrected signal.

In another optional embodiment, the processing system is further configured to calculate the amplitude corrected signal by dividing an amplitude of the received signal by an amplitude correction for a corresponding transmitter and receiver pair.

In another optional embodiment, the processing system is further configured to activate a first amount of the receivers for the receiving to provide a first cross range resolution at a first distance and activate a second amount of the receivers for the receiving to provide the first cross range resolution at a second distance, wherein
 the first and second distances are from the receivers,
 the second distance is less than the first distance; and
 the second amount of receivers is less than the first amount of receivers.

In another optional embodiment, the transmitters and the receivers are configured in a configuration selected from the group consisting of:
(a) linear;
(b) curved;
(c) planar;
(d) three-dimensional (3D); and
(e) a combination of configurations.

In another optional embodiment, at least a portion of the locations of the transmitters and receivers are synthetically established.

Another optional embodiment includes elements selected from the group consisting of:
(a) cooperative active repeaters;
(b) cooperative beacon sources;
(c) cooperative passive repeaters; and
(d) non-cooperative target reflectors.

In another optional embodiment, the processing system is further configured to perform the transmitting and the receiving using phase shifting performed using only digital signal processing.

According to the teachings of the present embodiment there is provided a non-transitory computer-readable storage medium having embedded thereon computer-readable code for sensing the computer-readable code including program code for:
(a) generating, for each of a multitude of resolution cells, a plurality of phase corrections, wherein each of the phase corrections:
 (i) corresponds to one of a plurality of transmitter and receiver pairs, and
 (ii) is based on a residue of a phase difference between:
  (A) a sum of distances from a given transmitter to the resolution cell and from a given receiver to the resolution cell, wherein the given transmitter and the given receiver are from the corresponding transmitter and receiver pair; and
  (B) a round trip distance from an element formation center to the resolution cell, wherein the element formation center is a reference point corresponding to locations of the transmitters and receivers,
(b) transmitting sequentially a signal from each of the transmitters;
(c) receiving a received signal in parallel with the transmitting;
(d) calculating a phase corrected signal from each phase correction based on the received signal for a corresponding transmitter and receiver pair; and
(e) summing the phase corrected signal for each the resolution cell to generate an emphasized object outcome.

According to the teachings of the present embodiment there is provided a computer program that can be loaded onto a server connected through a network to a client computer, so that the server running the computer program constitutes a controller in a system according to any one of the above claims.

According to the teachings of the present embodiment there is provided a computer program that can be loaded onto a computer connected through a network to a server, so that the computer running the computer program constitutes a controller in a system according to any one of the above claims.

BRIEF DESCRIPTION OF FIGURES

The embodiment is herein described, by way of example only, with reference to the accompanying drawings, wherein:

FIG. 13 is a sketch of an exemplary plurality of phase corrections for a resolution cell.

ABBREVIATIONS, DEFINITIONS, AND TERMINOLOGY

Figure 1:
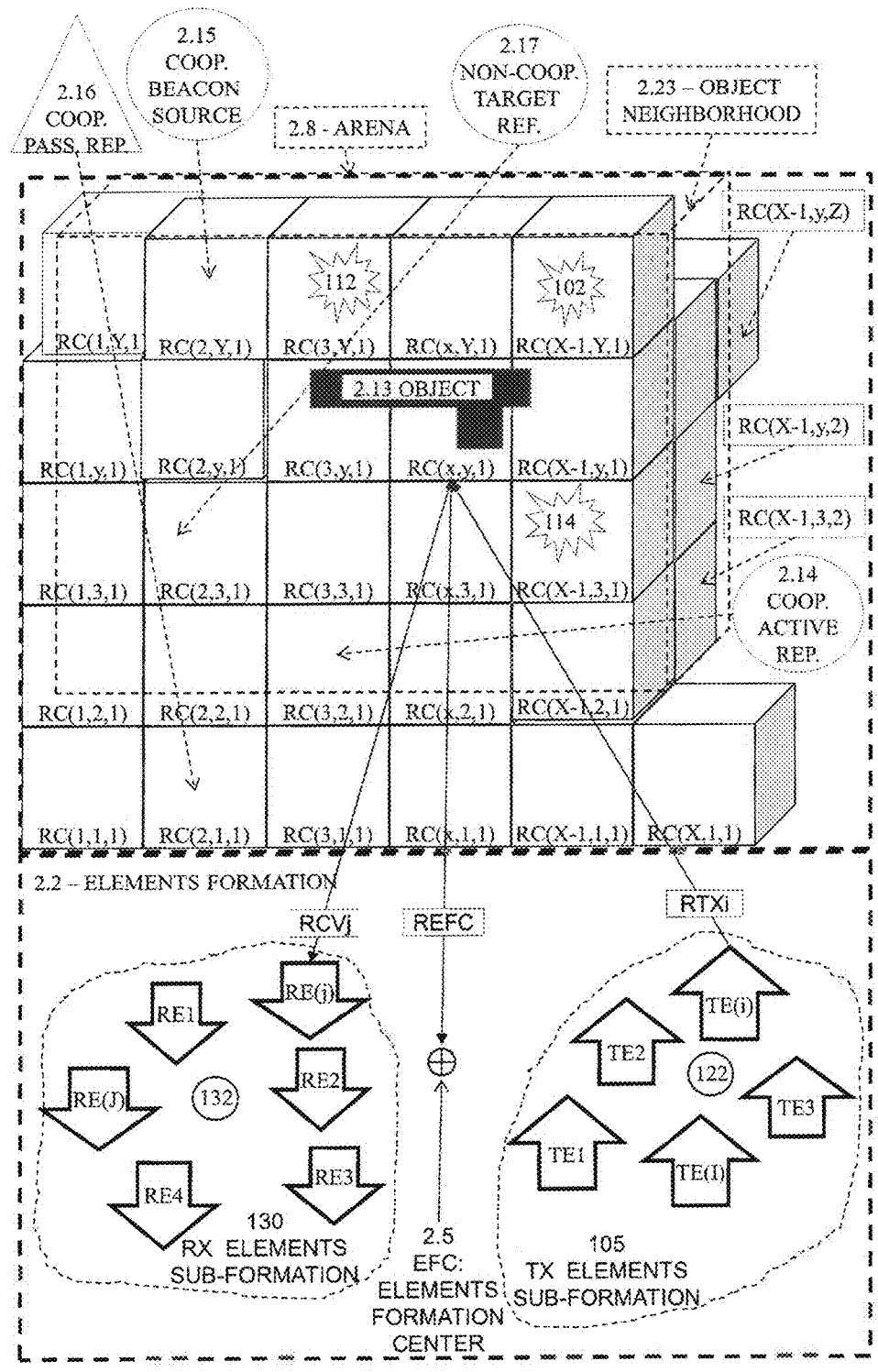
FIG. 1 is a diagram of search and investigation of objects in an arena of interest.

For convenience of reference, this section contains a brief list of abbreviations, acronyms, and short definitions used in this document. Terms in parenthesis following the initial term are alternative notations or abbreviations used in this document or known in the field. This section should not be considered limiting. Fuller descriptions can be found below, and in the applicable Standards.

2.1 Element (El., E): A single transmitter out of transmitters group (transmission element), or a single receiver out of a receivers group (receiver element), or a single transmitter and receiver out of group of transmitters and receivers.

2.2 Element formation (EF, El. Formation): A geometrical configuration (structure) of element locations in space (that is, in an area where the elements are deployed). The term includes the elements themselves, physical formations, and/or synthetic formations.

2.3 Physical EF: An EF in which physical elements are actually present in locations associated with the element.

2.4 Synthetic EF: An EF in which element locations are synthetically established, for example, by a motion of a single receiver, and/or a single transmitter, a single receiver-transmitter pair, or one or more transmitters and/or receivers. The receiver output is sampled at the desired synthetic element locations. Synthetic element locations are also referred to in the context of this document as "virtual element locations" for "virtual elements". A synthetic EF (or virtual EF) includes at least a portion of elements within the EF that are synthetic elements (at synthetic/virtual locations).

2.5 EF center: Geometrical reference point selected within or outside of the EF.

2.6 Element sub-formation (ESF, El. sub-formation, sub-formation): A single geometrical configuration of elements locations out of at least two elements locations in a structure. In other words, a subset of elements (transmitters and/or receivers) from a set of elements. ESFs can contain ESFs.

For example, if an EF has 10 elements, one ESF of the EF can be elements 1 to 5, and another ESF of the EF can be elements 2 to 4 and 6 to 9. In general, an ESF can include a subset of elements or all of the elements (of a formation).

2.7 Signal Distance Phase: The phase $\varphi_R$ that results from multiplying the range of signal traveling R, by $2\pi/\lambda$. Hence $\varphi_R$ is the result of the equation: $\varphi_R = 2\pi \cdot R/\lambda$, where $\lambda$ is a wavelength of the transmitted and/or received signal.

2.8 Arena: The three dimensional (3D) coverage volume in which embodiments perform, including performing high-resolution search, detection, and identification. An arena is also referred to as a field or area of operation of embodiments. An arena is partitioned into resolution cells (2.21), regardless of the presence of objects (2.13).

2.9 Correction Phase (Phase Correction): Calculated for every resolution cell (2.21) center in the arena (2.8) as following (refer to FIG. 1):
a) Sum the distances of the resolution cell center $R_{ij}$ from transmitter (i, TEi): $R_{TXi}$, and from receiver (j, REj): $R_{RCVj}$
b) Sum the round trip distances (twice the distance) of the resolution cell center from the EF center: $R_{00}$.
c) Calculate the distance difference $\Delta R_{ij}$ between $R_{ij}$ and $R_{00}$.
d) The phase correction $\varphi_{Rij}$ is the residue of the phase distance difference $\Delta R_{ij}$ over integer multiplications of $2\pi$ $$\varphi_{Rij} = (2\pi) \cdot [\Delta R_{ij}/\lambda - \text{floor}\{\Delta R_{ij}/\lambda\}]$$

e) Where floor$\{\Delta R_{ij}/\lambda\}$ is the maximal integer that is $\leq \Delta R_{ij}/\lambda$.

2.10 Signal coherent sum: Sum of the absolute value of signal amplitudes. Occurs when the signals have the same phase.

2.11 Signal weighted sum: Summing the signals after their multiplication with known weighted functions such as Dolph-Chebishef or others in order to optimize the summation side lobes.

2.12 Sequential Transmitter Switching: The transmitters are switched between transmission and no-transmission sequentially starting with a first transmitter and continuing with transmitters until the last transmitter. In transmission mode of one transmitter, all the other transmitters are not transmitting (silent, inactive). The switching repetition is not necessarily at the same sequence. In other words, in a sub-formation of at least two and at most all of the transmitters, each transmitter is individually activated at a known time for a known operation (such as duration) while the other transmitters are inactive. During a subsequent sequential transmitter switching cycle, the sequence (order) of activation of transmitters can differ from a previous sequential transmitter switching cycle.

2.13 Object: Body presents at arbitrary point in the arena, such that upon illuminating by transmission from the EF and/or radiometric-wise, reflects part of the incident signal towards the receivers of the EF (2.2). The term "object" generally includes reflector types that are part of the implementation, such as a cooperative active repeater 2.14, cooperative beacon source 2.15, and cooperative passive repeater 2.16, or not a part of the implementation, such as non-cooperative target reflector 2.17.

2.14 Cooperative active repeater: An object that receives the transmission signal, optionally: amplifies the transmission signal, code, frequency shifts, delays, and transmits the resulting signal through an operationally connected antenna towards the receivers of the EF.

2.15 Cooperative beacon source: An object that produces an independent signal within the bandwidth of the EF receivers, and transmits the signal towards the receivers through an operationally connected antenna.

2.16 Cooperative passive repeater: An object that passively receives the transmitted signal from the transmission of the EF and passively transmits partial of the received signal towards the receivers of the EF. A typical exemplary structure for a cooperative passive repeater is a concave triangular pyramid constructed of an electromagnetic reflective material, such as metal.

2.17 Non-cooperative target reflector: An object that passively receives the transmitted signal from the transmission of the EF and passively transmits a portion of the received signal, according to a structure of the non-cooperative target reflector, back to the receivers of the EF. The non-cooperative target reflector can be a target or interference for the embodiment.

2.18 Far field of the formation (FFF): The far field lower limit of the EF is defined in a similar way to the definition for various antennas in the literature. The distance of the far field limit $R_{FFF}$ of the formation is defined as cell distance from the element formation (EF) center calculated by: $R_{FFF} = 2 \cdot D^2/\lambda$, where D is the perpendicular aperture of the EF with respect to the $R_{FFF}$ and $\lambda$ is the wavelength of the transmitted center frequency (transmitted by a transmitter of the EF).

2.19 Near field of the EF (NFF): Defined at distances $R_{NFF}$ from the element formation (EF) which are shorter than the EF's far field limit ($R_{FFF}$). Implementations can perform from ranges larger than $R_{FFF}$ down to extremely close ranges such as $R_{NFF} \leq R_{FFF}/10,000$.

2.20 Adaptive EF (AEF): The number of elements that are actually operational (performing) within the EF is adaptive to the object location and angle with respect to the EF. For example, an adaptive EF can keep constant the cross range resolution (the resolution perpendicular to the range direction) of the object, independent of the object location within the arena in range and angle.

2.21 Resolution cell (RC, cell): The three-dimensional sizes of a special (designated) volume of the arena. The RC size in each dimension is determined by $q \times \lambda/D$, where q is typically 1.3 and D is the EF or EF sub array aperture in the dimension. A RC is defined whether or not there is an object (2.13) in the RC. In other words, RCs are typically designated for all portions of an arena, regardless of whether or not an object is in the portion of the arena for which RCs are defined. References to RCs are typically via an index, for example generic RC(x, y, z) or specific RC (1, 2, 1). The resolution is considered as a minimal distance between two equal objects return strength along a given dimension.

2.22 Grating lobes: Signal summation resulted in about signal coherent sum (2.10) due to ambiguity in $2\pi$ phase multiplications at some search angles. Can be caused by having receiver elements spaced too far apart with respect to the signal wavelength for a given search angle of the arena.

2.23 Object neighborhood: The relatively nearby vicinity of an object (2.13) at which other reflectors (for example non-cooperative target reflector 2.17) may exist. Typical nearby vicinity is between one and twenty resolution cells (2.21) about the object location. The size of the object neighborhood is not limited, and can include the entire arena (2.8).

2.24 Range (R): Distance.

2.25 Wavelength ($\lambda$): Typically of the transmitted and/or received signal. The ratio between the velocity of the signal propagation and the signal frequency.

2.26 Transmitter ESF (TX ESF): A sub-formation of at least one, typically two or more, and at most all transmitters. Referred to in FIG. 1 as 105.

2.26 Receiver ESF (RX ESF): A sub-formation of at least one, typically two or more, and at most all receivers. Referred to in FIG. 1 as 130. Also referred to in the context of this document as a "receivers group".

2.27 Range Correction Summation: Complex sum of the complex signals received by an EF's receivers (RX ESF) for each resolution cell, after performing amplitude correction of the received complex signals (see section 3.12).

2.28 Indexes i, j, n, k: as known in the art, generally used as integer values to differentiate items for example, elements of an EF, objects, resolution cells and similar.

2.29 Emphasized Object Outcome: The (final) sum over the receivers' outcomes of the phase corrected signals (phase signal corrections) or phase and amplitude corrected signals (amplitude signal corrections).

2.30 Received signal (Cell Return): The signal returned from a resolution cell to a receiver element provided that there is an object or partial object in a resolution cell. If there is no object in the resolution cell, this received signal approaches zero, in this case, the receiver output with respect to this cell will be mostly due to the receiver's own noise.

2.31 Phase Corrected Signal: Subtracting from each received signal a phase correction to calculate a corrected signal from each of the respective phase corrections (2.9) based on a received signal for a corresponding transmitter and receiver pair.

DETAILED DESCRIPTION

FIGS. 1 to 13

The principles and operation of the system and method according to a present embodiment may be better understood with reference to the drawings and the accompanying description. A present invention is a system and method for sensing, and in particular, concerns search and identification of objects in an arena of interest. The system facilitates electromagnetic detection and/or imaging, self-focused, in the near field, with high resolutions, high angle and cross range, nearby arenas functionality, high range resolution, and high accuracies, as compared to conventional solutions. Larger volume arenas can be searched with greater range resolution, accuracy, and angle and cross range as compared to conventional solutions. Embodiments include implementations sufficiently low power to be acceptable for use in human applications (for example, meeting HERP standards).

3. General Method of Operation

Refer to FIG. 1, a diagram of search and investigation of objects in an arena of interest. An elements formation (EF) 2.2 includes transmitter elements sub-formation (ESF) 105 and a receiver's elements sub-formation (ESF) 130. The transmitter ESF 105 typically includes a plurality of transmitters (TE) and the receivers ESF 130 includes a plurality of receivers (RE). Individual transmitters are referred to using the notation "TEi" or "TE(i)", where "i" (lowercase letter "i") is an integer index from a starting value [normally zero (0) or one (1)] to a maximum of "I" (capital letter "I"). In the current figure, five transmitters are shown: generic transmitter TE(i), transmitters TE1, TE2, TE3, and TE(I). Similarly, individual receivers are referred to using the notation "REj" or "RE(j), where "j" (lowercase letter "j") is an integer index from a starting value [normally zero (0) or one (1)] to a maximum of "J" (capital letter "J"). In the current figure, six receivers are shown: generic receiver RE(j), receivers RE1, RE2, RE3, RE4, and RE(J).

An elements formation center 2.5 is designated for the EF 2.2. Similarly, a transmitter ESF center 122 is designated for the transmitter ESF 105 and a receiver ESF center 132 is designated for the receivers ESF 130. An arena 2.8 is typically adjacent to the EF 2.2. The boundary between the EF 2.2 and the arena 2.8 is not necessarily fixed, and can change, depending on the configuration of elements and operations of the system. For example, if additional elements are brought online, or during operation, the element formation is adapted (see AEF 2.20), the boundary between the EF 2.2 and the arena 2.8 can change. The arena 2.8 typically includes a plurality of objects 2.13, such as other objects such as first object 112, second object 114, third object 102, cooperative active repeaters 2.14, cooperative beacon sources 2.15, cooperative passive repeaters 2.16, and non-cooperative target reflectors 2.17. Objects in the arena 2.8 that are relatively close to an object of interest (for example, object 2.13) are referred to as being in the object neighborhood 2.23 of the object of interest. The arena can include any combination of the above-mentioned objects or none of the above-mentioned objects.

At least a portion of the arena 2.8 is divided into typically a multitude of three-dimensional (3D) volumes known as resolution cells (RCs, or simply "cells"). Each resolution cell typically has a plurality of associated phase corrections. Each phase correction has a corresponding transmitter and receiver pair. The term "multitude" can refer to a large number, for example, 10's, 100's, 1000's, or more of RCs.

References to RCs are typically via an index, for example generic RC(x, y, z) or specific RC(1, 2, 1). In the current description a non-limiting 3D index of (x, y, z) is used. In the current figure, the arena has been divided into an exemplary array of RCs, starting at a chosen origin of RC(1, 1, 1) and having a maximum number of cells along the X-axis of X, Y-axis of Y, and Z-axis of Z. Note that the size and shape of the RC array is not limited, for example not limited to rectangular (non-rectangular)—the shape of the RC array is based on the shape of the arena or the portion or the arena being searched and investigated.

Refer now to FIG. 13, a sketch of an exemplary plurality of phase corrections for a resolution cell (RC). Each of the, typically, multitude of RC's has a, typically, plurality of phase corrections. Each phase correction corresponds to one of a plurality of transmitter and receiver pairs. In the current figure, three transmitters (I=3, TE1, TE2, TE3) and four receivers (J=4, RE1, RE2, RE3, RE4) are being used in the element formation (EF) or element sub-formation (ESF) for search or investigation. References to phase corrections ($\varphi_{Rij}$) (and amplitude corrections) are typically via an index corresponding to a transmitter (i, TEi) and receiver (j, REj) pair. The current figure shows a variety of equivalent notations for transmitter receiver pairs, for example $\varphi_{R(1,1)}$, $\varphi_{R\ 1,1}$, and $\varphi_{R\ 11}$. One skilled in the art will realize that the stored data structure for the coefficient matrix is five dimensional (x, y, z, i, j).

3.1 In general, an electromagnetic signal returns from an object (2.13) towards receivers (REj) in a receivers group (RX ESF 130) positioned at certain locations in the EF (2.2). The locations of individual receivers (RE) can be physical locations or virtual locations. The signal emphasize is with respect to signal returns to the receivers from other reflectors (objects 2.13) in the object neighborhood (2.23).

Typically, a plurality of elements are used, including a plurality of transmitters (i transmitters, where i is an integer, each transmitter designated as $TE_i$) and a plurality of receivers (j receivers, where j is an integer, each receiver designated as $RE_j$). Unless specified otherwise, an element can be physical or virtual. An EF and an ESF can include all physical, all virtual, or a mixture of physical and virtual elements, where at least a portion of the elements are physical and/or at least a portion of the elements are virtual. For simplicity in this document, references to elements are to "element(s)". "receiver(s)", and "transmitter(s)" without specifying physical and/or virtual.

3.2 Conventional phased array methods and systems perform electromagnetic search using hardware-wise (hardware-based) phase shifters at least for transmission and normally for both transmission and reception. Implementations of the current embodiment provide electromagnetic search without requiring use of hardware phase shifters in transmission and reception, at least in part based on the innovative method and system described in the current document. The calculations and processing for scanning of the arena (2.8) at both transmit and receive and the phase corrections can be performed using general purpose processors (such as central processing units [CPUs]), or firmware processors (such as FPGAs), as described below in paragraphs 4.5 to 4.6 and 5.5 to 5.6. Custom and specific hardware can be used for implementation, for example to increase processing speed, such as the exemplary digital processor within the signal processor (block 206 of FIG. 3) that performs the described calculations.

3.3 Grating lobes (2.22) can be reduced or avoided by at least two different element spacings (d) over the signal wavelength ($\lambda$), namely at least two different ($\lambda$/d)'s, for example single formation dual frequency designation. This can be implemented by operating each element (2.1) in two different frequencies. One such non-limiting example implementation is the following:
  a) A low frequency is determined by a spacing (physical or virtual location) of receiver elements in the RX ESF based on object location (estimated or assumed), and chosen so a low-resolution scan of the arena can be performed for which there are no grating lobes. The low frequency reference signal can be provided by reference signal source 605 via LO to the transmitter 601.
  b) A high frequency is obtained by multiplying the reference signal by a factor of, for example 3, in order to achieve a desired high resolution about the detected object.
  After performing an initial search stage using a low frequency and avoiding grating lobes, the results of the search stage can be used to select a relatively higher frequency signal and subset of resolution cells about the object location detected in the search stage, for performing a subsequent high-resolution investigation stage.

3.4 Embodiments can perform with arena (2.8) presence deeply in the near field of the EF.

Figure 2:
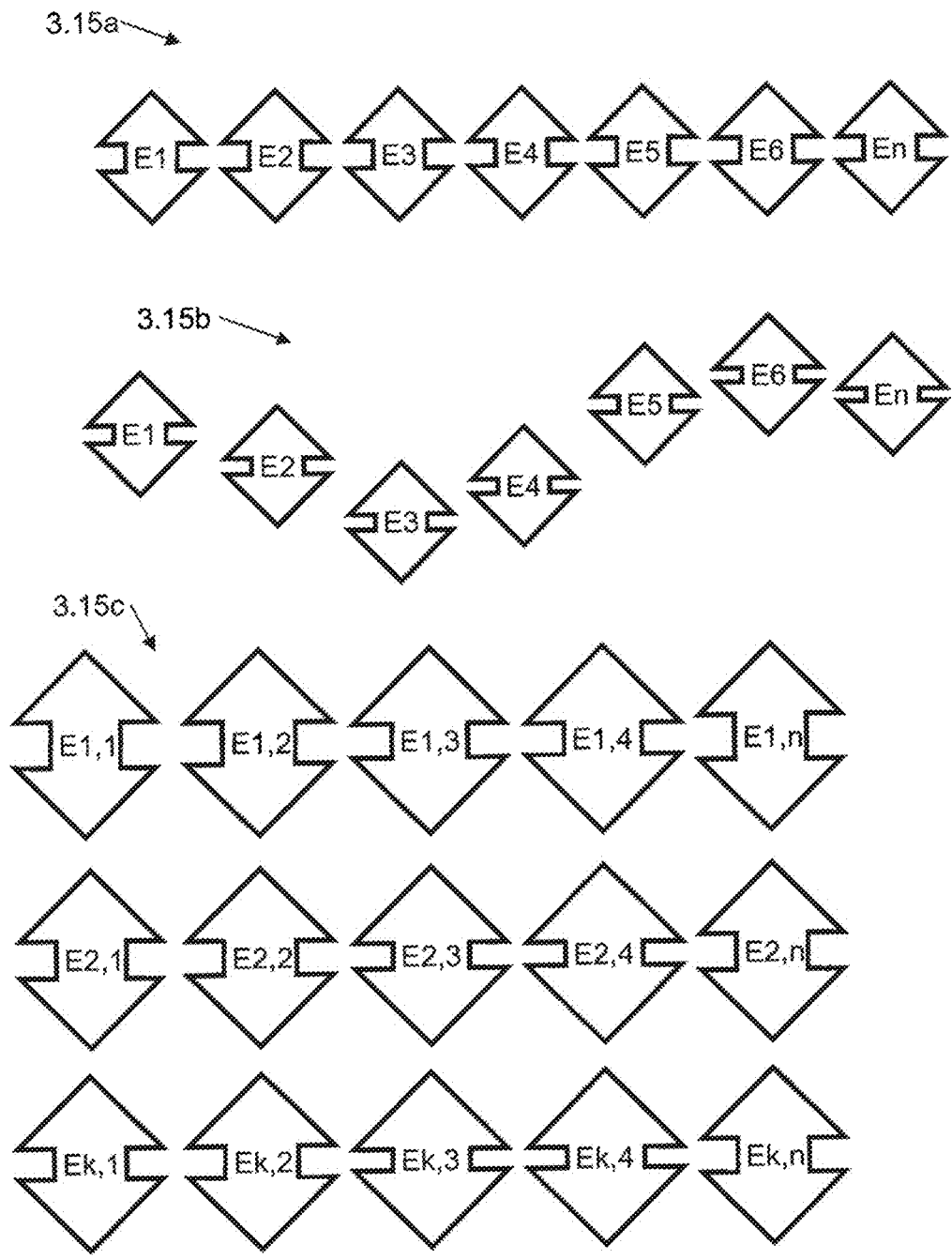
FIG. 2 is a sketch of various exemplary formation configurations.

3.5 Refer to FIG. 2, a sketch of various exemplary formation configurations, explained below in more detail. There are various possible configurations of at least two elements (E) in an EF, including but not limited to:
  A linear EF (3.15a) detailed in the first implementation example,
  a curved EF (3.15b) detailed in the second implementation example,
  a planar EF (3.15c) as a possible extension of the first implementation example,
  a three dimensional EF (3.15.d) as an extension to another dimension, and
  a combination of at least a part of multiple configurations, such as ESF (2.6) as describe in the second implementation example.

3.6 There are various possible elements distributions within the EF such as: Homogenous (uniform) element distribution as in the first implementation example as well as in the ESF in the second implementation example, or random element distribution as in the second implementation example, or pseudo-random distribution or combination of part of these distributions as ESFs.

3.7 There are various possible element types within an EF such as:
  Transmitters only,
  receivers only,
  elements, which are both transmitter and receiver,
  receivers only and at least one transmitter,
  passive receivers based upon reception of radiometric, and
  combination of part of the element types as ESFs.

In the first implementation example there is a combination of transmitters only ESF and receivers only ESF. In the second implementation example there is a combination of receivers only ESF against a beacon object and of synthetic transmitters ESF against receivers only ESF.

3.8 There are various possible object types that can be used in embodiments of the system such as:
  cooperative active repeater (2.14),
  a cooperative beacon source (2.15) such as the capsule beacon in the second implementation example,
  cooperative passive repeater (2.16), and
  a non-cooperative target reflector (2.17) as in both the first and the second implementation examples.

3.9 Configurations (structures) of EFs include:
  Physical (2.3) as in the first implementation example and also as an ESF in the second implementation example,
  Synthetic EF as an ESF in the second implementation example, and
  combination of the two configurations as in the second implementation example.

3.10 Embodiments can use adaptive element formations (AEF, 2.20). AEFs can be used to keep constant the cross range resolution (the resolution perpendicular to the range direction) of the object, independent of the object location within the arena in range and angle.
  c) An AEF size can be determined by the equation:

$$L = k \cdot \lambda \cdot R \cdot \cos \theta / \text{Res}$$

in order to keep the cross range resolution of the object independent of the object location within the arena in range and angle, where:
  L—The AEF size for given location of the object.
  k—A weighting factor (a unit without weighting and 1.3 as an exemplary signal weighting sum (2.11) function).
  $\lambda$—A wavelength of the transmitted signal.
  R—A range from the scanned cell to the AEF center.
  $\theta$—The angle between the vector from the scanned cell to the above center and the central perpendicular the AEF.
  Res—The desired resolution. For example, about a centimeter in the first implementation example and about 0.2 cm in the second implementation example, without excluding the examples from being implemented in different (smaller or larger) values.

In a preferred embodiment, the system is designed with wavelength and EF (RX ESF) size so that at the maximum range for which the system is to operate, the system has a desired cross range resolution. During operation, the number of receivers being operated (receiving) can be reduced to reduce the AEF size, that is, reducing the physical distribution of receiver elements, thus increasing the angle and cross range of the receiver array so that for a given resolution cell the cross range resolution decreases, allowing the same cross range resolution that was initially used for resolution cells relatively far away from the receiver ESF to be used for resolution cells relatively closer to the receiver ESF.

Embodiments can include partial AEF. That is, an AEF for part of the arena and non AEF (full EF or ESF) in the complementary part of the arena 3.11 A signal-weighted sum can be calculated by summing the signals after multiplication with known weighted functions such as Dolph-Chebishef or others in order to optimize the summation side lobes (as described in section 2.11).

3.12 Range corrections, specifically amplitude correction, can be done similar to phase correction (sections 2.9, 4.5). A range correction summation can be performed by summing the signals for the various object ranges from the transmitter i and receiver j.

An exemplary implementation includes: generating, for each of a multitude of resolution cells, a plurality of amplitude corrections. Each of the amplitude corrections corresponds to one of a plurality of transmitter and receiver pairs, and is based on: (1) a ratio between a multiplication of the distances from a given transmitter to the resolution cell and from a given receiver to the resolution cell, and (2) a square of the distance from an element formation center to the resolution cell. The given transmitter and the given receiver are from the corresponding transmitter and receiver pair.

Obtaining the amplitude corrected signal by dividing the amplitude of the received signal by the respective amplitude correction for a corresponding transmitter and receiver pair.

3.13 Embodiments can incorporate at least two of the contents 3.1 to 3.12.

3.15 Referring again to FIG. 2. EF configurations and implementations can include:
- 3.15a) linear element positioned formation, horizontally and/or vertically structured.
- 3.15b) Curved trajectory element positioned formation with arbitrary curved shape.
- 3.15c) Planar element positioned formation with rectangular or arbitrary two-dimensional (2D) shaped closed contour. An exemplary array of n by k elements is shown.
- 3.15d) Three-dimensional (3D) elements positioned formation with rectangle or arbitrary 3D shaped closed contour.
- 3.15e) The above EF examples can incorporate the following optional and/or alternative features:
  1) The elements location distribution within each formation can be homogeneous (uniform), random, or pseudo-random,
  2) Each formation can be a physical formation or a synthetic formation,
  3) Each formation can include:
     a. Active transmitting only elements,
     b. Active transmitting and receiving elements,
     c. Receiving only elements and a single transmitting element such as cooperative and/or non-cooperative target reflector and/or repeater,
     d. Passive reception elements such as radiometry.
- 3.15f) EFs can include any combinations of the above EFs for both transmitters and receivers, which serve as sub-formations.

4. The System

This section is based on the previously described general method of operation, and includes general and specific options and alternatives for implementations of systems and methods based on the current description.

Figure 3:
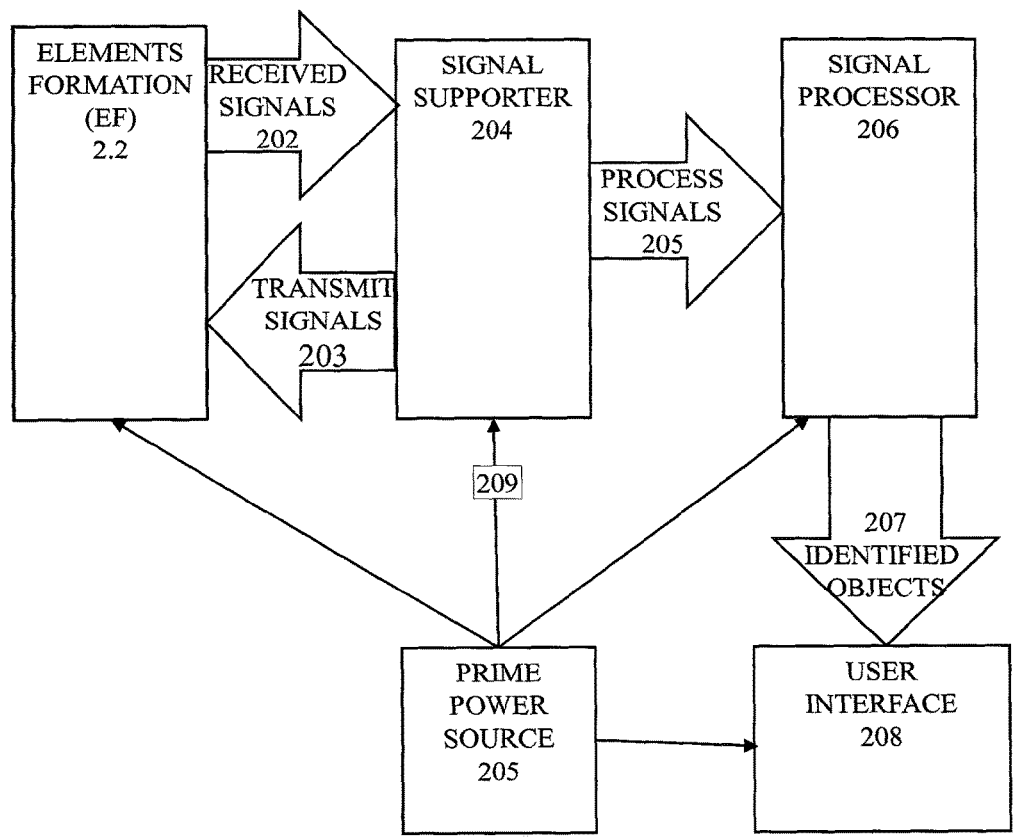
FIG. 3 is a high-level block diagram of an exemplary system implementation.

4.1 Refer now to FIG. 3, a high-level block diagram of an exemplary system implementation. The signal supporter module 204 sends transmit signals 203 to the EF 2.2 for the EF 2.2 to transmit. An element formation (EF, 2.2) sends received signals (202) to a signal supporter module (204).

The signal supporter can function as a control unit for the system. Control functions include, but are not limited to, activating transmitters and activating receivers. In the current non-limiting example, each transmitter is sequentially activated. In parallel with activation of each transmitter, a receiver ESF (typically all the receivers in the EF) are activated to (possibly) receive a received signal reflected back from an object in the arena toward each active receiver.

4.1b) As described elsewhere in this document and in detail below in section 4.2, at least one transmitter (TXi) from the EF 2.2 transmits to the arena 2.8. An exemplary implementation of a single transmitter is described in paragraph 4.2. Three implementation examples of the transmitters EFs are described in the system implementation examples. One exemplary implementation in the first system implementation example, and two exemplary implementations in the second implementation example.

4.1c) As described elsewhere in this document and in detail below in section 4.3, at least one receiver (REj) from the EF 2.2 receives returned signals from the arena 2.8. The number of receivers participating in the object emphasizing can be determined according to the adapting procedure described in sections 4.17 and 4.18.

4.1d) The signal supporter module (204) produces a reference signal (block 605 of FIG. 6), samples the receiver outputs, and performs a complex FFT on the samples to provide signal I&Q (in phase and quadrature) components for a signal phase calculation. The reference signal is sent as one of the transmit signals 203 to the EF 2.2. The signal supporter 204 components are known in the technical literature and described for an example in section 4.4. The signal supporter send process signals 205 to a signal processor 206.

4.1e) A signal processor 206 receives process signals 205, and then can be used to subtract the correction phase $\varphi_{R_{ij}}$ from the phase of the signal that transmitted and received by the pair (i, j) of transmitter (i) and receiver (j) of the EF 2.2, resulting in phase correction signals, also referred to as phase signal corrections. Then the signal processor performs summation of the phase corrected signals of all the receivers of the pairs participating. These phase corrections and summations are described further in sections 4.5 and 4.6. The signal processor 206 can also perform amplitude correction as described elsewhere in this document and in detail below in section 3.12.

Note that the use in this description of exemplary phase correction and amplitude correction techniques should not be considered limiting. It is foreseen that alternative techniques may be used to calculate a corrected signal.

4.1f) A user interface 208 can be used to obtain the outputs (shown as identified objects 207) of the signal processor 206 and display the identified objects to a user (not shown) according to specific implementations of the system. An implementation example of the user interface is presented in section 4.21.

4.1g) One or more power sources, such as a prime power source 205, can be used to supply the required voltages and currents to the various components of the system, the power supplies shown as arrows 209. The detailed required voltages and currents are determined according to the components selected for the system implementation and their existing professional catalogues.

Figure 4:
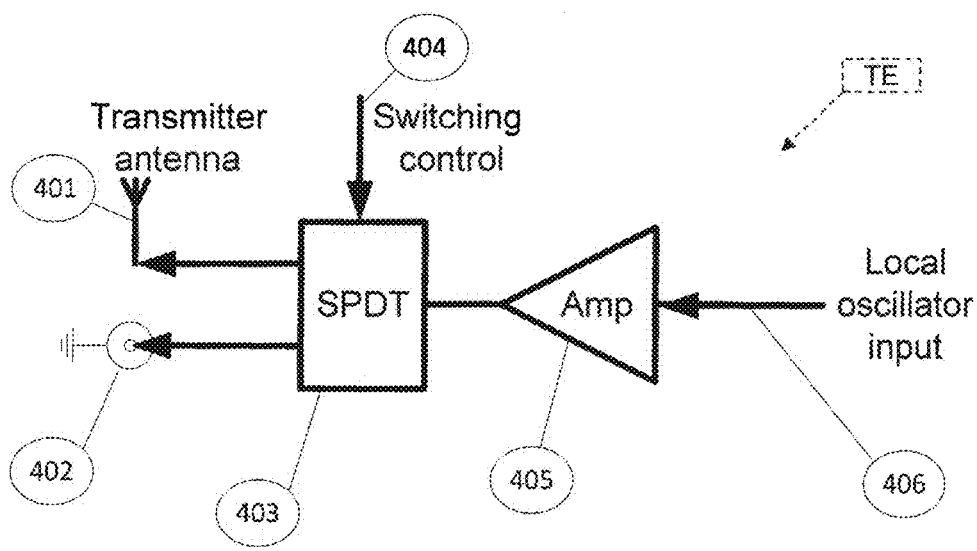
FIG. 4 is an exemplary implementation of a single transmitter.

4.2 Refer now to FIG. 4, an exemplary implementation of a single transmitter (TE).

4.2a) A transmitter TE receives the reference signal (601 from 605) obtained at transmitter input (406). The reference signal may be amplified and filtered (405), switched (for example by a SPDT (single pole double throw)) switch (403) according to a switching control signal (404), between a transmitter antenna (401) and a matched load (402), or otherwise. The transmitter antenna (401) transmits towards the arena (2.8).

4.2b) The transmission frequency affects the system resolution. Typical transmission frequencies can be from a few hundred MHZ to few hundreds of GHZ, without excluding implementations at lower and higher frequencies.

4.2c) Transmission frequency is, for example, in E-Band in the first implementation example and, for example, in Ku-Band in the second implementation example, without excluding the examples from being implemented in different frequency bands (lower or higher) than these bands.

Figure 5:
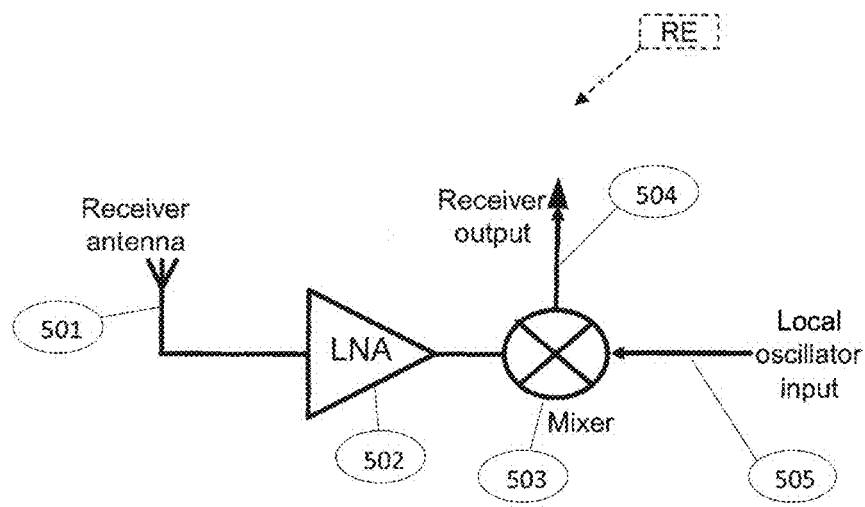
FIG. 5 is an exemplary implementation of a single receiver.

4.3 Refer now to FIG. 5, an exemplary implementation of a single receiver (RE). The single receiver can be of a type such as a homodyne or supper-heterodyne receiver as known in the professional literature. The current figure is a non-limiting example of a homodyne receiver. The receiver RE receives a signal from the arena, through a receive antenna (501) The received signal may be amplified and filtered in an LNA (Low Noise Amplifier 502), down converted in frequency in a mixer (503) and filtered to the signal baseband frequency at the receiver output (504). Local oscillator input 505, coherent with the transmission, can be supplied by LO to the receiver 602 (shown in FIG. 6).

Figure 6:
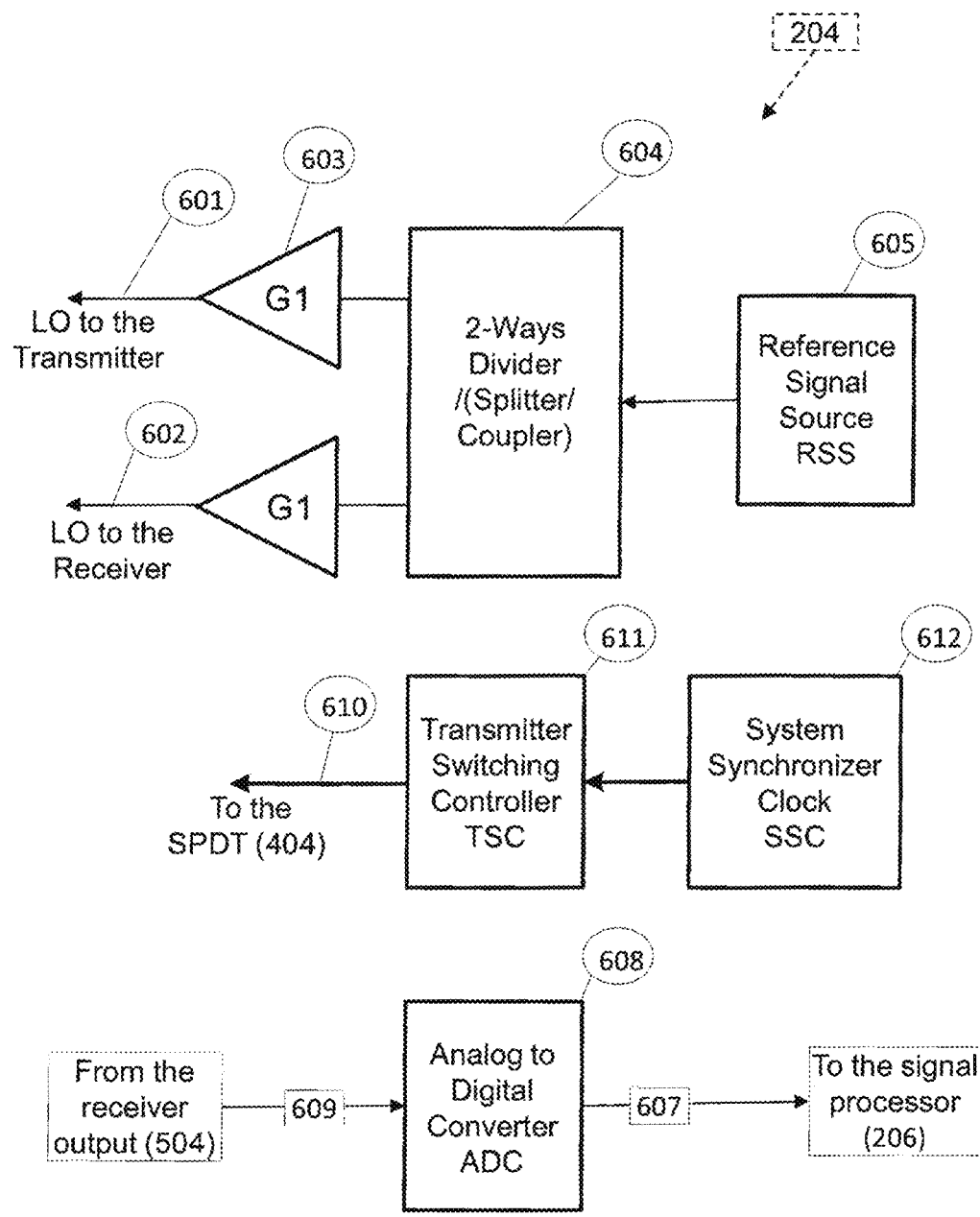
FIG. 6 is an exemplary implementation of a signal supporter module.

4.4 Refer now to FIG. 6, an exemplary implementation of a signal supporter module 204. The signal supporter can include various sub-modules, components, and can be configured to perform the following functions.

4.4a) A reference signal source (605) module is configured for generating a reference signal. The reference signal can be split into two reference signals by a 2-ways divider (604) also known as a splitter, by a coupler, or in other ways. Each of the reference signals can be amplified by an amplifier (G1, 603), and delivered for use as an LO to the transmitter 601 (local oscillator input 406 in FIG. 4 sent as transmit signals 203 in FIG. 3) and as an LO to the receiver 602 (local oscillator input 505 in FIG. 5 sent as transmit signals 203 in FIG. 3).

4.4b) The reference signal source (605) module can generate a reference signal using various techniques. Techniques for generating reference signals and desirable properties of reference signals are known in the professional literature. Two exemplary waveform implementations are:

1) A CW (Continues Wave) waveform without range resolution capability, implemented by local oscillator and known in the professional literature.

2) A LFM (linear Frequency Modulated) waveform with good range resolution capability determined by the waveform frequency bandwidth, is implemented by DDS (Direct Digital Synthesizer) or otherwise, and known in the professional literature.

4.4c) The generating of the sequential switching control signal 404 for the transmitters switching controller (611) can be from the system clock generator (612, also known as the system synchronizer clock SSC), or otherwise, and delivery to the SPDT switch 403 through the interconnections (the output line to the SPDT 610 of FIG. 6, the switching control signal 404 of FIG. 4 via the transmit signals 203 of FIG. 3).

4.4d) Sampling the receiver outputs (504 in FIG. 5 via from the receiver output line 609 in FIG. 6) by the ADC (608, analog to digital converter) outputs the sampled signals (via to the signal processor line 607 is process signals like 205 of FIG. 3) to the signal processor 206 input.

4.5 The operations performed by the signal processor 206 include:

a1) Subtraction of the correcting phase $\varphi_{R_{ij}}$ (2.9d) from the phase of the complex signal that resulted from the transmission and reception by the each one of the pair (i, j) of transmitter (i) and receiver (j) of the EF, for each resolution cell (2.22) of the arena (2.8).

a2) Amplitude correction as described in section 3.12 b) Summation of the phase corrected signals or phase and amplitude corrected signal of all the receivers of the pairs in 4.5a.

c) Calculation of the reception threshold based upon the signal return from the object neighborhood (2.23) by an algorithm such as a constant false alarm rate (CFAR) technique known in the professional literature. For example, measuring the values of signals in adjacent cells as compared to a tested cell, then calculating an average value and defining a threshold higher than this average. Once a received signal for a tested cell crosses this threshold, there is a detection for the tested cell.

d) Comparing the emphasized object outcome with the reception threshold of 4.5c) for the object detection and separation from adjacent reflectors.

e) Delivery of the signal processor output outcomes (identified objects, 207) to the user interface (208)

4.6 The Signal processor can calculate the phase correction $\varphi_{R_{ij}}$ from a) for each one of the arena (2.8) resolution cells (2.22) as follows:

a) Calculation of the range difference $\Delta R_{ij}$ (2.9c) between two ranges: a first range is the sum of the ranges of the resolution cell from transmitter i and from receiver j (2.9a). A second range is the twice the range from the resolution cell to the EF Center (2.5)

b) Calculation of the remainder of the multiplication $(2\pi \cdot \Delta R_{ij}/\lambda)$ from integer multiplications of $2\pi$.

4.21 An exemplary implementation of the user interface 208 is a smart-phone like display superimposing an identified object on a video of the scene, and/or with an identified object symbol, and/or markers, presenting the identified object data, such as location upon the suspected person, range, angle with respect to the display orientation, and/or sounds an alarm.

4.22 Implementations of the system can incorporate at least two of the contents of sections 4.1 to 4.21

5. A First Implementation Example 5.1 In a first implementation example, an automatic, un-noticeable electromagnetic search and identification of concealed metal objects on person's body implementation is detailed, referred to in this description as "The HLS implementation", where HLS stands for Home Land Security.

The HLS implementation gives emphasis to an electromagnetic signal that returns from a concealed metal object (object 2.13 in FIG. 1) towards receivers group positioned at locations in linear EF 3.15a. The signal emphasize is with respect to the signal returns to the receivers from other reflectors in the object neighborhood (2.23). This section is based on the previously described general method of operation, and figures, and includes general and specific options and alternatives for implementations of systems and methods based on the current description.

5.1a) The EF in this HLS implementation, referred to as the HLS EF, is linear transmitters ESF and linear receivers ESF (as described in section 3.15a).

5.1b) Each transmitter from the HLS EF of 5.1a, transmits to the arena (2.8). Refer to the description in section 4.2.

5.1c) The number of receivers participating in the HLS object emphasizing is determined according to the adapting procedure described in section 5.17 based on section 3.10.

5.2 The exemplary single transmitter from the transmitters group in the HLS implementation operates similar to the description in section 4.2.

5.2b) The transmission frequency affects significantly the system resolution. In the HLS implementation the transmission frequency is, for example, in the range of 60 to 95 GHz, preferably in E-Band at about 78 GHz, without excluding implementations at different frequencies (lower or higher).

5.3 The single receiver in the HLS implementation operates similar to the description of section 4.3.

5.4 The signal supporter module 204 in the HLS implementation performs operations including the following:

5.4b) Generating the reference signal in the HLS implementation incorporates the generation of a LFM (linear Frequency Modulated) waveform. The LFM waveform provides good range resolution capability determined by the LFM waveform frequency bandwidth. Implementation of the LFM in the HLS implementation can be by DDS (Direct Digital Synthesizer) known in the professional literature 5.9 The transmit and receive scanning the of the arena (2.8), phase, and amplitude corrections, in the HLS implementation, are similar to as described in section 3.2, 5.5, 5.6 and 3.12 respectively.

5.13 The configuration of the elements distribution within the EF in the HLS implementation is a homogenous element distribution in both transmitters and receivers ESFs (2.6).

5.14 The configurations of the elements types within the EF in the HLS implementation are a combination of transmitters only ESF and receivers only ESF.

5.15 The object structure in the HLS implementation is a non-cooperative target reflector (2.17) of concealed metal object on person's body.

5.16 The physicality configuration of the EF in the HLS implementation is a combination of two physical elements (2.3) ESF (2.6). Transmitters and receivers ESF, in which physical transmitters and physical receivers actually present in their locations respectively.

5.17 The AEF is performed in the HLS implementation as defined in section 2.20, and as detailed in section 3.10. The purpose of the AEF is to keep constant the cross range resolution (in cm) of the HLS object, independent of the object location within the arena in range and angle.

Figure 7:
FIG. 7 is a photograph of an exemplary un-noticeable identification of concealed metal objects on a person's body scenario.
Figure 8:
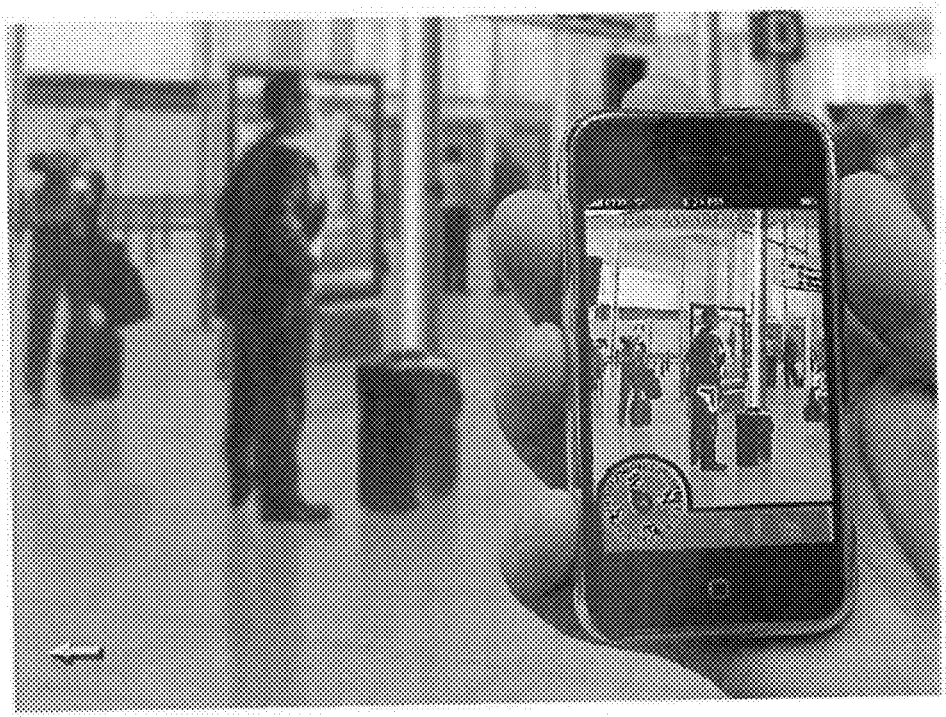
FIG. 8 is an exemplary photograph of a user interface display for the un-noticeable identification of concealed metal objects on a person's body implementation example.

5.21 Refer now to FIG. 7, a photograph of an exemplary un-noticeable identification of concealed metal objects on a person's body scenario, and to FIG. 8, an exemplary photograph of a user interface display for the un-noticeable identification of concealed metal objects on a person's body implementation example. One implementation of user interface 208 for the HLS embodiment is a smart-phone-like Threat display superimposed a the video of the scene, and with the HLS identified object symbol, and markers, presenting the HLS identified object data such as location upon the suspected person, range, angle with respect to the display orientation, and sound alarm.

6. A Second Implementation Example 6.1 In a second implementation example, electromagnetic medical imaging of potential tumors within a person's colon is described. The imaging of potential tumors within a person's colon is a world well known subject. Colonoscopy and optical capsule imaging are described in the medical literature and in existing patents. However, an electromagnetic imaging of potential tumors within a person's colon is an important challenge that has not been met yet. The present embodiment implementation of electromagnetic colon imaging for potential tumors, especially suitable for children and underweight people is presented herein, and referred to in this description as "The Medical Implementation".

This section is based on the previously described general method of operation, and figures, and includes general and specific options and alternatives for implementations of systems and methods based on the current description.

Figure 10:
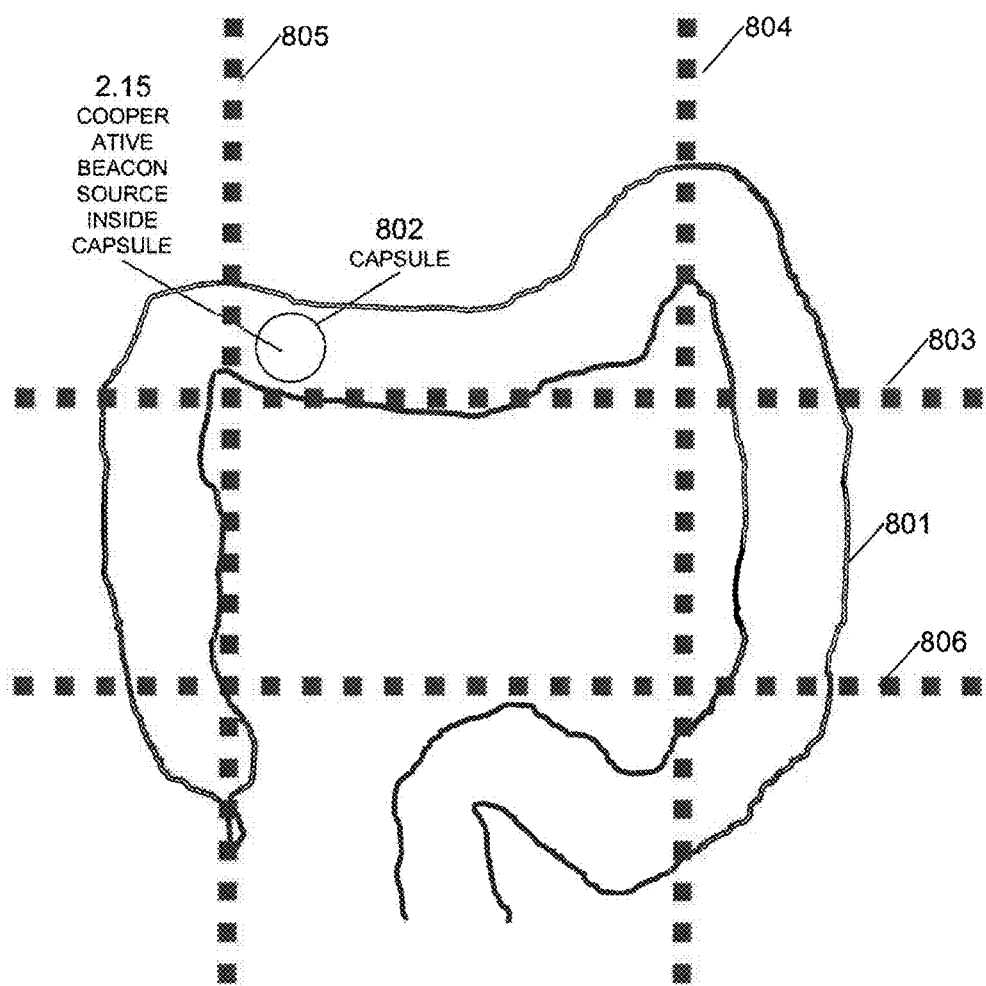
FIG. 10 is a sketch of an exemplary EF for the Medical Implementation.

6.2 Refer to FIG. 10, a sketch of an exemplary EF for the Medical Implementation. The Medical Implementation includes two EF configurations (6.2a and 6.2b), including a synergistic cooperation between the two configurations:

6.2.A) Physical EF configuration established by:
1) Four linear ESFs positioned externally on a person's abdomen (803, 804, 805, and 806).
2) A cooperative beacon source (2.15) within a capsule (802), swallowed into the person colon (801)
3) The cooperative beacon source (2.15) is detected and accurately location measured by the four ESFs (803, 804, 805, 806).

6.2.B) Synthetic EF configuration established by:
1) Signal transmission from AEF (2.20) driven from the four ESFs (803, 804, 805 and 806).
2) The AEF center is determined by the cooperative beacon source (2.15) location measured by the ESF (6.2.A.1)
3) A synthetic EF (2.4) established by a receiver motion through the colon. The receiver is installed into the capsule 802.
4) The receiver output is transmitted for external processing as a short periodic communication message within the beacon (of 6.2.A.2) transmission frame time.
5) The external processing performs colon imaging from 6.2.B.4 for detection and identification of the non-cooperative target reflector (2.17) of potential tumors in the colon 6.3 The Medical Implementation emphasizes the following electromagnetic signals with respect to the signal returns to the receivers from other reflectors in the object neighborhood (2.23):

A. The signal returns from the cooperative beacon source (2.15) (6.2.A.2) towards the physical receivers of the EFs 6.2.A.1.

B. The signal returns from the non-cooperative target reflector (6.2.B.5) towards the Synthetic EF receivers 6.2.B.3.

6.3a) The EFs in the Medical Implementation of 6.2.A and 6.2.B are defined in section 2.2.

6.3b) Each transmitter from the EF in the Medical Implementation in both configurations 6.2.A and 6.2.B transmits to the arena (2.8). An implementation of a single transmitter is similar to the description in section 4.2 and further described in section 6.4

6.3c) The Receivers:

A. The group of receivers of the EF of 6.2.A, in the Medical Implementation, receives the returned signals from the arena (2.8). Operation of receivers are described above. The number of receivers participating in the Beacon object emphasizing of 6.2.A can be determined according to the adapting procedure described in section 3.10 as further detailed in section 6.19.

B. The single receiver of the Synthetic EF of configuration 6.2.B, in the Medical Implementation, receives the returned signals from the arena (2.8). The receiver content is detailed in FIG. 4.25. The number of receiver sampling participating in the non-cooperative target reflector object emphasizing of 6.2.B can be determined according to the adapting procedure described in section 3.10 as further detailed in section 6.19.

6.3e) The Signal Processor:

A. In 6.2.A the signal processor subtracts the correction phase $\varphi_{Rij}$ from the phase of the signal received by receiver (j) of the physical EF of 6.2.A.1 from the beacon object 6.2.A.2. Amplitude correction is performed as described in 3.12. Then the signal processor performs summation of the phase and amplitude corrected signals of all the receivers participating. These phase corrections, amplitude correction, and summations are described in sections 6.8, 3.12 and 6.9 respectively.

B. In 6.2.B the Signal processor subtracts the correction phase $\varphi_{Rij}$ from the phase of the signal received by the j sample of receiver in the capsule of the synthetic EF of 6.2.B. The signal is the returned received from the non-cooperative target reflector object of 6.2.B. Then the signal processor performs summation of the phase and amplitude corrected signals of all the receiver sampling participating in the synthetic formation. These phase corrections and summations are described in sections 6.8, 3.12, and 6.9 respectively 6.4 An exemplary single transmitter from the transmitters group in both configurations (6.2.A and 6.2.B) in the Medical Implementation is known in the professional literature and described above in section 4.2.

6.4b) The transmission frequency affects the system resolution. In both configurations (6.2.A and 6.2.B) of the Medical implementation the transmission frequency is, for example, in the range of 15-25 GHz, preferably in Ku-Band at about 18 GHz, without excluding the example from being implemented in different (lower or higher) frequencies.

6.6b) The waveform: Generating the reference signal in the Medical Implementation (605) incorporates the generation of an LFM (linear Frequency Modulated) waveform. This waveform provides good range resolution capability determined by the LFM waveform frequency bandwidth. Implementation of the LFM in the Medical implementation is by DDS (Direct Digital Synthesizer) known in the professional literature.

6.7 The operations performed by the signal processor 206 in the Medical Implementation include:

a1) Subtraction of the correcting phase $\varphi_{Rij}$ (2.9d) from the phase of the complex signal that resulted from:

A. The Beacon object transmission and reception by the each one of the receivers (j) of the configuration 6.2.A of the Physical EF, for each Resolution cell (2.22) of the arena (2.8)

B. The transmission and reception by the each one of the pair (i, j) of transmitter (i) of the Physical EF of 6.2.B and the synthetic receiver (j) of the configuration 6.2.B of the Synthetic EF, for each Resolution cell (2.22) of the arena (2.8)

a2) Amplitude correction as in 3.12 b) Summation of the phase and amplitude corrected signal corrected signals of all the receivers of the pairs in 6.7a.

c) Calculation of the reception threshold based upon the signal return from the object neighborhood (2.23) by a CFAR technique known in the professional literature.

d) Comparison the emphasized object outcome in both configurations (6.2.A and 6.2.B) with the reception threshold of 6.7c for the Medical Implementation object detection and its separation from its adjacent reflectors e) Delivery of the signal processor output outcomes (207) to the Medical Implementation user interface (208).

6.8 The Signal processor calculations: The Signal processor calculates in the Medical Implementation the phase correction $\varphi_{Rij}$ from 6.7a and the amplitude correction for each one of the arena (2.8) resolution cells (2.22) as follow:

6.8 a) Calculation of the range difference $\Delta R_{ij}$ (2.9c) between two ranges (Range 1 and Range 2) as following:

A. In configuration 6.2.A:

Range 1 is twice the range of the resolution cell from the physical receiver j (2.9a)

Range 2 is the twice the range from the resolution cell to the Physical EF Center (2.5) of the Medical Implementation B. In configuration 6.2.B:

Range 1 is the sum of the ranges of the resolution cell from physical transmitter i and from the synthetic receiver j (2.9a)

Range 2 is the twice the range from the resolution cell to the Synthetic EF Center (2.5) of the Medical Implementation 6.8b) Calculation for both configurations of the remainder of the multiplication $(2\pi \cdot \Delta R_{ij}/\lambda)$ from integer multiplications of $2\pi$ 6.11 The transmit and receive scanning the of the arena (2.8) and the phase corrections, in the current exemplary medical implementation, are similar to as described in section 3.2 (as further described in paragraphs 6.7 and 6.8)

6.14 The configuration of the EF of the Medical Implementation is:

A. Four linear physical receivers ESF in 6.2.A

B. A curved EF in the Synthetic ESF of 6.2.B, and four linear physical transmitters ESF 6.15 The configuration of the elements distribution within the EF in the Medical Implementation is:

A. In configuration 6.2.A, a homogenous (uniform) element distribution in the four linear physical receivers ESF B. In configuration 6.2.B, random synthetic element distribution in the curved, synthetic receivers, ESF. This distribution is determined by the temporary velocity of the capsule and the constant rate of sampling of the synthetic receiver output. In addition, there is a homogenous (uniform) element distribution in the four linear physical transmitters ESF.

6.16 The configurations of the elements Types within the EF in the Medical Implementation are transmitting and receiving elements in the four linear physical ESF. The receivers are for 6.2.A configuration and the transmitters are for 6.2.B configuration. In addition, there is a single receiver in the capsule for the synthetic ESF of 6.2.B configuration.

6.17 The object configuration in the Medical Implementation is cooperative beacon source (2.15) in 6.2.A configuration and a non-cooperative target reflector (2.17) of potential tumors within the colon, in 6.2.A configuration.

6.18 The physicality configuration of the EF in the Medical Implementation is:
  A. Four physical receivers ESFs in configuration 6.2.A
  B. A Synthetic receivers ESF in addition to four physical receivers ESFs in configuration 6.2.B 6.19 The AEF is performed in the Medical Implementation as defined in 2.20, and as detailed in section 3.10 with the wavelength of about 1.7 cm in the current example.

6.23 An exemplary implementation of the user interface 208 for the Medical Implementation is object display superimposed on the video of the scene, and with the Medical identified object symbol, and markers, presenting the Medical identified object data such as location with respect to the colon, range, angle.

Figure 9:
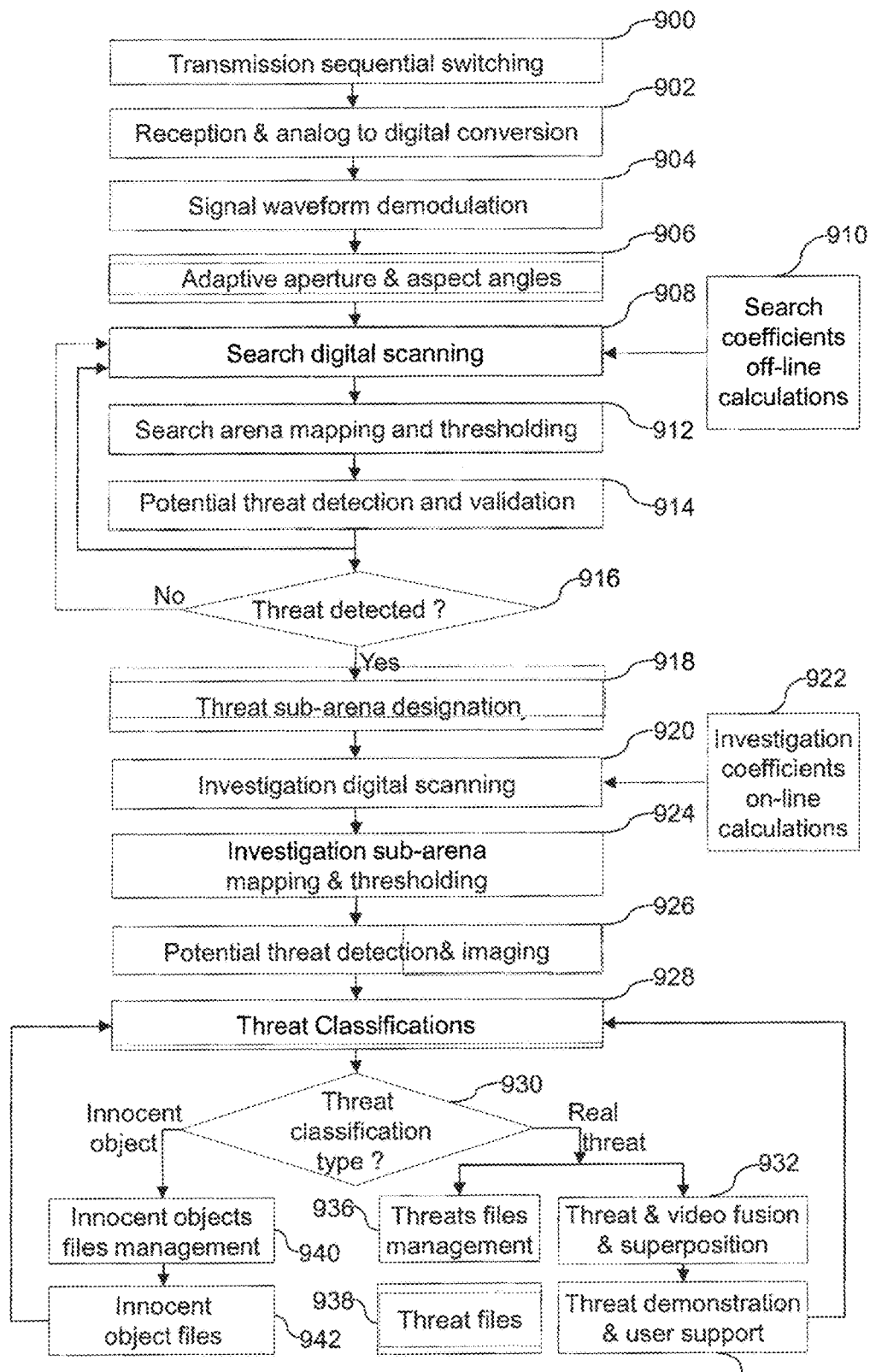
FIG. 9 is a flowchart of implementation.

Refer now to FIG. 9, a flowchart of implementation, an exemplary implementation of overall operation is shown. Transmitters are sequentially switched for transmitting a signal toward the arena 900. Receivers may receive a received signal returned from objects in the arena and perform processing such as scaling (weighting), filtering, and analog to digital conversion (ADC) 902. The received signal is demodulated 904 and optionally adaptive aperture and aspect angles processing is performed 906. Coefficients for a search stage can be provided 910 to the search stage digital scanning 908. The arena, or portion of the arena is mapped and a threshold operation can be performed 912. The emphasized object outcome can be sent for classification and determination 914 that an object is potentially a threat 916. This process can be repeated as shown by arrow 915. If a threat is not detected, the method returns to search stage digital scanning 908. If a threat is detected, the method continues at block 918 to determine a threat sub-arena designation (portion of the arena where the threat was detected) 918. This determining of a sub-arena can be used to provide investigation coefficients (possibly via on-line calculations) 922 for investigation digital scanning 920. Investigation sub-arena mapping and thresholding 924 results in potential threat detection and imaging 926. Threat classification can then be performed 928 (on the emphasized object outcome of the investigation stage). Based on the threat classification type 930, if the threat is classified as an innocent object, innocent objects files management 940 can be used to update innocent object files 942 and feedback to threat classification 928. If the threat is classified as a real threat, threat and video fusion and superposition 932 can be performed and used for threat demonstration and user supports 934. Alternatively and/or in addition, a real threat can be handled by threats files management 936 to update threat files 938 and feedback to threat classification 928.

Figure 11:
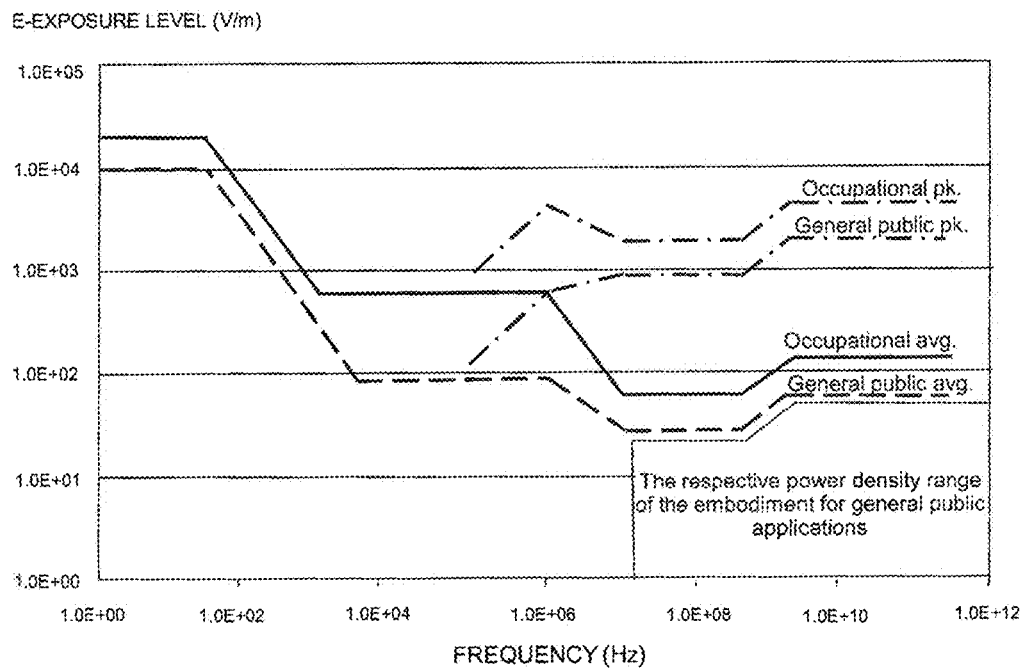
FIG. 11 is a diagram of the HERP standard.

Refer now to FIG. 11, a diagram of the HERP standard. The HERP (Hazard of Electromagnetic Radiation to Personal) standard is imposed by the International Commission on non-Ionizing Radiation Protection (ICNIRP), 1998, Occupational Exposure. The power density range required for embodiments for general public applications is much below HERP standard, for example in the first implementation example in paragraph 6 typically between 2 to 3 orders of magnitude below HERP standard, namely between (1/100) to (1/1000) times below HERP standard. For embodiments that are not public applications, the power level of the embodiment can be much larger than the HERP standards.

Exemplary effective radiation power level range of the transmission in various embodiments can be, but not limit by, from −20 dBm to +80 dBm (from 0.01 mW to 100 kW). This power level range is wide since the embodiment is generic and may be used in a wide variety of applications: For example, the low power level can be for object identification by small formation positioned within few centimeters distance in clean propagation environment. The high power level can be, for example, with space object identification by an element formation on Earth positioned towards the sky.

Exemplary frequency bands of the embodiment can be from HP to Terahertz (namely, from 30 MHz to 3 THz). This frequency range is wide since the embodiment is generic and may be used in a wide variety of applications: beginning, for example, from object by a small formation positioned within few centimeters distance, and ending, for example, with space object identification of objects in space by an element formation on Earth positioned towards the sky.

To increase the clarity of the claims, the claims refer to "receivers" and "transmitters". However, this language should not be considered limiting, and one skilled in the art will realize that sub-formations of at least a portion of the receivers and transmitters can be implemented.

For example, depending on the specific requirements of the application, a larger number of transmitters and/or receivers can be deployed than strictly necessary to achieve an aperture required for an application. A portion of the deployed elements can be used operationally, while another portion of the elements can be powered off and reserved for use in case an operational unit malfunctions. Alternatively, a portion of elements can be powered off to reduce power consumption of the EF, operate the system with a smaller aperture, or operate at a reduced resolution for an initial search stage.

In a case where a smaller number of elements are being operated than have been deployed (available for operation), calculation of phase corrections and amplitude corrections for the offline (reserve, non-operational) units can be calculated at the same time as the phase corrections and amplitude corrections are calculated for the operational units. For example, phase corrections and amplitude corrections for some (a portion) or all of the elements can be generated offline, pre-calculated prior to system deployment, during system configuration, or during a calibration stage.

In general, a method for sensing begins with generating, for each of a multitude of resolution cells, a plurality of phase corrections and amplitude corrections. Each of the phase corrections: (i) corresponds to one of a plurality of transmitter and receiver pairs, and (ii) is based on a residue of a phase difference between:
  (A) a sum of distances from a given transmitter to the resolution cell and from a given receiver to the resolution cell, wherein the given transmitter and the given receiver are from the corresponding transmitter and receiver pair; and
  (B) a round trip distance from an element formation center to the resolution cell, wherein the element formation center is a reference point corresponding to locations of the transmitters and receivers.

As described above, the phase corrections (and amplitude corrections) can be generated prior to operation/execution, off-line, during installation/deployment, or during a calibration stage. Generation of phase corrections for an investigation area (portion of the arena determined by a search stage to be of interested for a more detailed search) can be performed prior to beginning operation (prior to the search) or as part of the operation (after performing a search and determining what portion [sub-set] of resolution cells are of interest, but prior to beginning the investigation stage). The off-line coefficient calculation concept expedites real time phase and amplitude corrections of the signals received in real time. This reduces required real time processing, which can be highly important to mitigate processing requirements in system implementation.

In general, a first execution (operation of the system) can be considered an initial execution of the method an embodiment, for example, a search stage. The initial execution can use pre-determined RCs, pre-generated corrections (phase, or phase and amplitude) and calculation coefficients. These values used during the initial execution can also be used for subsequent operation (executions). Additionally or alternatively, during or after the initial execution, new or additional values can be generated. For example, based on the interim (during execution) or final (after finishing execution) of the initial execution, new values can be determined for RCs, phase corrections, amplitude corrections, and calculation coefficients.

Each transmitter is operated in sequence to transmit a signal at a pre-determined frequency. In parallel with each transmission of a transmitter, a received signal is received in parallel by active (operational) receivers in the EF or ESF. As will be obvious to one skilled in the art, the received signal can be significant if there is a reflection/returned signal from an object in the portion of the arena being searched or investigated. The received signal can be insignificant (negligible, null) if there is not a sufficient return signal received at the receiver (insufficient level of received signal), or the detected received signal can be the result of environment or receiver noise.

Whatever received signal, significant or negligible, the method continues with calculating a corrected signal from each phase correction and amplitude correction based on the received signal for a corresponding transmitter and receiver pair and the resolution cell. The corrected signal can also be thought of as a signal correction.

The corrected signals for each resolution cell are summed to generate an emphasized object outcome.

The emphasized object outcome can then be sent for processing, for example image or object processing, for classification. Image and object processing techniques are known in the art, and will not be discussed here. The resulting emphasized object outcome and/or results of classification can be provided to a user, for example identified objects 207 to user interface 208 as shown in FIG. 3 and FIG. 8.

Based on the above non-limiting example using sequential transmitter switching, one skilled in the art will be able to implement methods and systems using sequential receiver switching and implement transmitter and receiver pair switching. Sequential receiver switching includes transmitting from all transmitters in at least a transmitter ESF in parallel with receiving at a single receiver element, then continuing with parallel transmission from a plurality of transmitters to a single receiver. Transmitter and receiver pair switching includes transmitting from a single transmitter in parallel with receiving at a single receiver, then continuing with another transmitter and receiver pair.

One skilled in the art will realize that references to "parallel" transmission and receiving are well known in the vernacular as transmitting and receiving "at the same time".

In other words, at least a portion of the time duration of transmission overlaps with a portion of the time duration of receiving.

Figure 12:
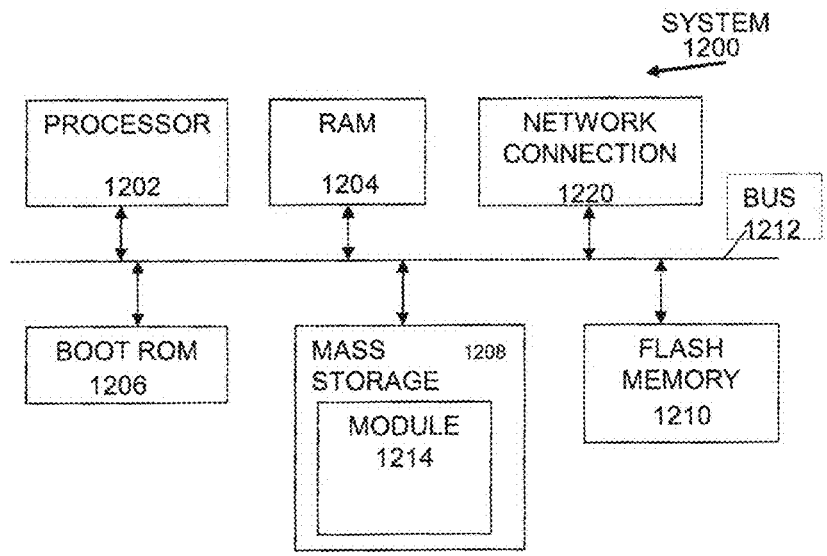
FIG. 12 is a high-level partial block diagram of an exemplary system configured to implement the present invention.

FIG. 12 is a high-level partial block diagram of an exemplary system 1200 configured to implement sensing of the present invention. System (processing system) 1200 includes a processor 1202 (one or more) and four exemplary memory devices: a RAM 1204, a boot ROM 1206, a mass storage device (hard disk) 1208, and a flash memory 1210, all communicating via a common bus 1212. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 1202 including but not limited to reduced instruction set computer (RISC) architecture and/or complex instruction set computer (CISC) architecture. A module (processing module) 1214 is shown on mass storage 1208, but as will be obvious to one skilled in the art, could be located on any of the memory devices.

Mass storage device 1208 is a non-limiting example of a non-transitory computer-readable storage medium bearing computer-readable code for implementing the sensing methodology described herein. Other examples of such computer-readable storage media include read-only memories such as CDs bearing such code.

System 1200 may have an operating system stored on the memory devices, the ROM may include boot code for the system, and the processor may be configured for executing the boot code to load the operating system to RAM 1204, executing the operating system to copy computer-readable code to RAM 1204 and execute the code.

Network connection 1220 provides communications to and from system 1200. Typically, a single network connection provides one or more links, including virtual connections, to other devices on local and/or remote networks. Alternatively, system 1200 can include more than one network connection (not shown), each network connection providing one or more links to other devices and/or networks.

System 1200 can be implemented as a server or client respectively connected through a network to a client or server.

Processing system 1200, including one or more processors 1202, can be configured to implement a controller including functions of the signal supporter 204 and the signal processor 206. Alternatively, a controller can include independent hardware for the signal supporter 204 and the signal processor 206 serving as a processing system for embodiments of the present invention.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A method for sensing comprising the steps of:
   (a) generating, for each of a multitude of resolution cells, a plurality of phase corrections, wherein each of said phase corrections:
      (i) corresponds to one of a plurality of transmitter and receiver pairs, and
      (ii) is based on a residue of a phase difference between:
         (A) a sum of distances from a given transmitter to said resolution cell and from a given receiver to said resolution cell, wherein said given transmitter and said given receiver are from said corresponding transmitter and receiver pair; and
         (B) a round trip distance from an element formation center to said resolution cell, wherein said element formation center is a reference point corresponding to locations of said transmitters and receivers,
   (b) transmitting sequentially a signal from each of said transmitters;
   (c) receiving a received signal in parallel with said transmitting;
   (d) calculating a phase corrected signal from each phase correction based on said received signal for a corresponding transmitter and receiver pair; and
   (e) summing said phase corrected signal for each said resolution cell to generate an emphasized object outcome.

2. The method of claim 1 wherein each of said resolution cells is at a pre-determined location and has a given volume.

3. The method of claim 2 wherein after an initial execution of the steps of claim 1 with said multitude of resolution cells having said given volume, then subsequently executing the steps of claim 1 with a subset of said multitude of resolution cells each having a second volume smaller than said given volume and locations based on said initial execution.

4. The method of claim 3 wherein said initial execution uses a first frequency and said subsequent execution uses a second frequency, said second frequency higher than said first frequency.

5. The method of claim 3 wherein said initial execution uses a first set of coefficients for said calculating, said first set of coefficients generated off-line for each transmitter and each receiver, and generated on-line for each of said transmitter and receiver pair, and said subsequent execution uses a second set of coefficients, said second set of coefficients generated after beginning said initial execution.

6. The method of claim 1 further including a step of: weighting said received signal prior to said calculating.

7. The method of claim 1 further including a step of: calculating a threshold for an object neighborhood of each said resolution cell.

8. The method of claim 7 further including a step of: providing object detection based on comparing each said emphasized object outcome to each said threshold.

9. The method of claim 1 wherein after an initial execution of the steps of claim 1 with said signal being a low-frequency signal, then based on said emphasized object outcome subsequently executing the steps of claim 1 with said signal being a high-frequency signal, said high-frequency signal having a greater frequency than said low-frequency signal.

10. The method of claim 1 further including the steps of:
   (f) generating, for each of said multitude of resolution cells, a plurality of amplitude corrections, wherein each of said amplitude corrections:
      (i) corresponds to one of said plurality of transmitter and receiver pairs, and
      (ii) is based on a ratio between:
         (A) a multiplication of distances from said given transmitter to said resolution cell and from said given receiver to said resolution cell, wherein said given transmitter and said given receiver are from said corresponding transmitter and receiver pair; and
         (B) a square of distance from said element formation center to said resolution cell,
   (g) calculating an amplitude corrected signal from each said amplitude correction based on said received signal for a corresponding transmitter and receiver pair; and
   (e) wherein said summing includes summing said amplitude corrected signal.

11. The method of claim 1 wherein a first amount of said receivers are operational for said receiving to provide a first cross range resolution at a first distance and a second amounts of said receivers are operational for said receiving to provide said first cross range resolution at a second distances, wherein
   said first and second distances are from said receivers,
   said second distances are less than said first distance; and
   said second amount of receivers is less than said first amount of receivers.

12. The method of claim 1 wherein said transmitters and said receivers are configured in a configuration selected from the group consisting of:
   (a) linear;
   (b) curved;
   (c) planar;
   (d) three-dimensional (3D); and
   (e) a combination of configurations.

13. The method of claim 1 wherein at least a portion of said locations of said transmitters and receivers are synthetically established.

14. A system for sensing comprising:
   (a) a plurality of transmitter and receiver pairs; and
   (b) a processing system containing one or more processors, said processing system being configured to:
      (i) generate, for each of a multitude of resolution cells, a plurality of phase corrections, wherein each of said phase corrections:
         (A) corresponds to one of a plurality of said transmitter and receiver pairs; and
         (B) is based on a residue of a phase difference between:
            (I) a sum of distances from a given transmitter to said resolution cell and from a given receiver to said resolution cell, wherein said given transmitter and said given receiver are from said corresponding transmitter and receiver pair; and (II) a round trip distance from an element formation center to said resolution cell, wherein said element formation center is a reference point corresponding to locations of said transmitters and receivers,
(ii) activate transmitting sequentially a signal from each of said transmitters;
(iii) activate receiving a received signal in parallel with said transmitting;
(iv) calculate a phase corrected signal from each phase correction based on said received signal for a corresponding transmitter and receiver pair; and
(v) sum said phase corrected signal for each said resolution cell to generate an emphasized object outcome.

15. The system of claim 14 wherein each of said resolution cells is at a pre-determined location and has a given volume.

16. The system of claim 15 wherein said processing system is further configured: after an initial execution of the processing of claim 14 with said multitude of resolution cells having said given volume, then subsequently executing the processing of claim 14 with a subset of said multitude of resolution cells each having a second volume smaller than said given volume and locations based on said initial execution.

17. The system of claim 16 wherein said processing system is further configured to activate said transmitters during said initial execution to transmit a first frequency and during said subsequent execution to transmit a second frequency, said second frequency higher than said first frequency.

18. The system of claim 16 wherein said processing system is further configured with a first set of coefficients to calculate during said initial execution, said first set of coefficients generated off-line, and configured with a second set of coefficients to calculate during said subsequent execution, said second set of coefficients generated after beginning said initial execution.

19. The system of claim 14 and periodical calibration of the system further including elements selected from the group consisting of:
(a) cooperative active repeaters;
(b) cooperative beacon sources;
(c) cooperative passive modulated and unmodulated repeaters; and
(d) non-cooperative target reflectors.

20. A non-transitory computer-readable storage medium having embedded thereon computer-readable code for sensing the computer-readable code comprising program code for:
(a) generating, for each of a multitude of resolution cells, a plurality of phase corrections, wherein each of said phase corrections:
 (i) corresponds to one of a plurality of transmitter and receiver pairs, and
 (ii) is based on a residue of a phase difference between:
  (A) a sum of distances from a given transmitter to said resolution cell and from a given receiver to said resolution cell, wherein said given transmitter and said given receiver are from said corresponding transmitter and receiver pair; and
  (B) a round trip distance from an element formation center to said resolution cell, wherein said element formation center is a reference point corresponding to locations of said transmitters and receivers,
(b) transmitting sequentially a signal from each of said transmitters;
(c) receiving a received signal in parallel with said transmitting;
(d) calculating a phase corrected signal from each phase correction based on said received signal for a corresponding transmitter and receiver pair; and
(e) summing said phase corrected signal for each said resolution cell to generate an emphasized object outcome.

* * * * *